Figure 1:
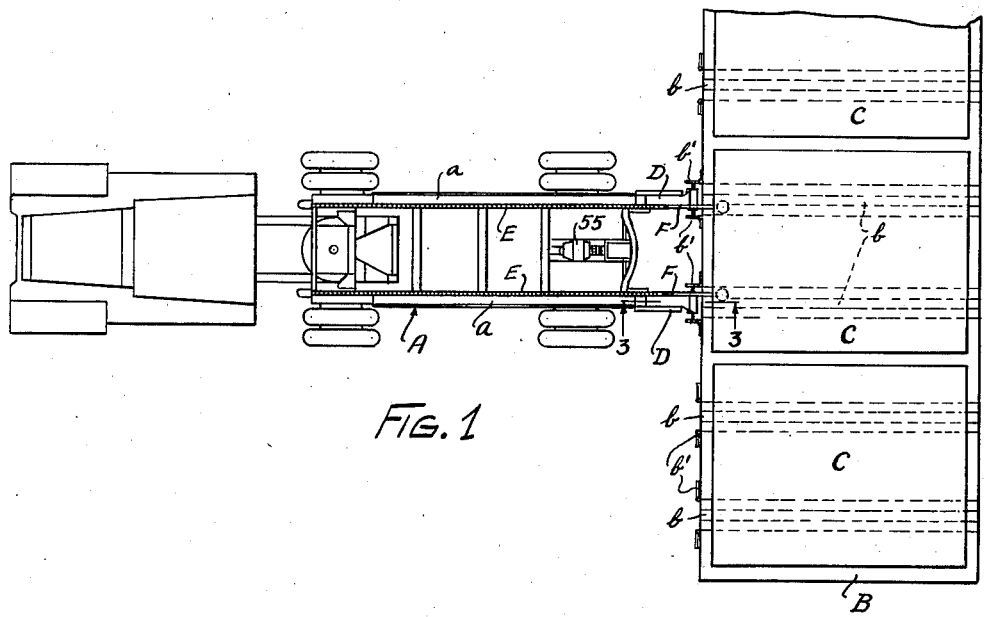

July 20, 1937.      B. F. FITCH      2,087,249
PROPELLING MECHANISM FOR FREIGHT CONTAINERS
Filed Oct. 18, 1935      2 Sheets-Sheet 1

INVENTOR.
Benjamin F. Fitch,
BY
Dalai, Golrick & Tears
ATTORNEYS.

Patented July 20, 1937

2,087,249

UNITED STATES PATENT OFFICE 2,087,249

PROPELLING MECHANISM FOR FREIGHT CONTAINERS

Benjamin F. Fitch, Greenwich, Conn.

Application October 18, 1935, Serial No. 45,616

21 Claims. (Cl. 214—38)

My copending application No. 1,926, filed January 15th, 1935, for an apparatus for transferring freight, of which the present case is a continuation in part, shows, describes and claims an apparatus comprising a highway truck equipped with bridge members to connect the truck with a vehicle or platform, a freight container adapted to be supported by the truck or platform, propelling chains on the truck and bridge members, and suitable push and pull members adapted to connect the container to the chains, whereby the container may be pushed or pulled across the bridge members from the truck to the platform or vice versa.

The present invention is concerned with the connection of the container to the propelling chain, and particularly with mechanism for effectively attaching the push and pull members of such connection to the chain while allowing ready detachment therefrom. A feature of such mechanism is that while the attachment is readily effected and released, it is very secure in operation and is not loosened by the chain being diverted from a single straight course as it passes from the substantially horizontal truck to the inclined bridge member or vice versa. The invention is hereinafter more fully explained in connection with an approved embodiment thereof illustrated in the drawings.

Figure 2:
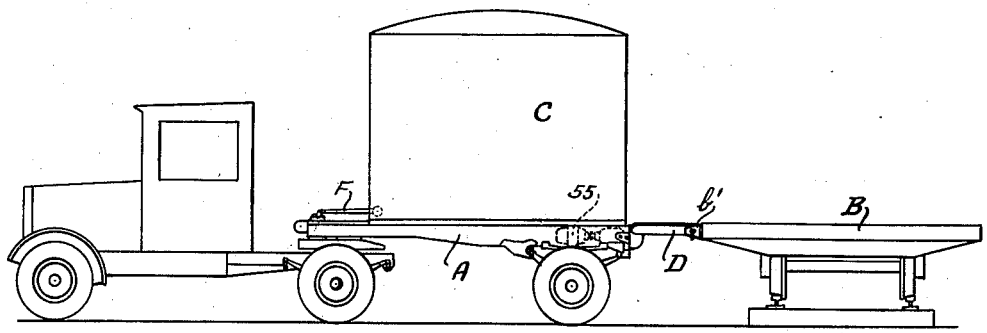
Figure 9:
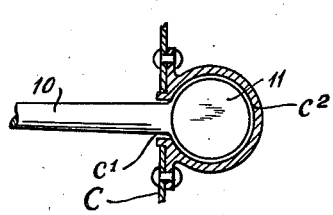
Figure 3:
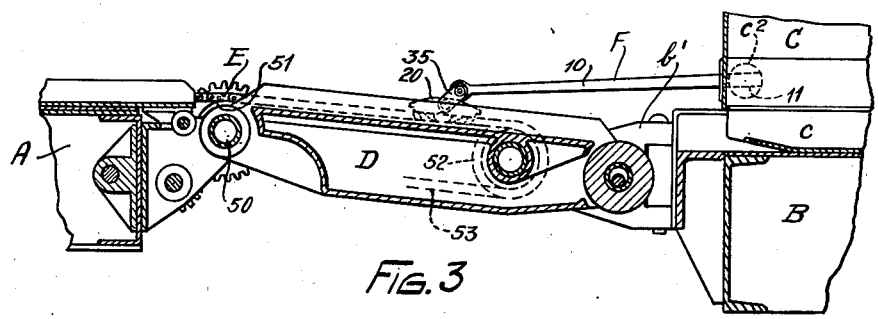
Figure 4:
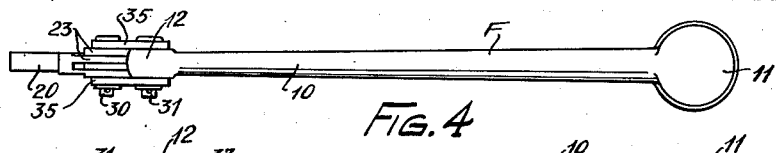
Figure 5:
Figure 6:
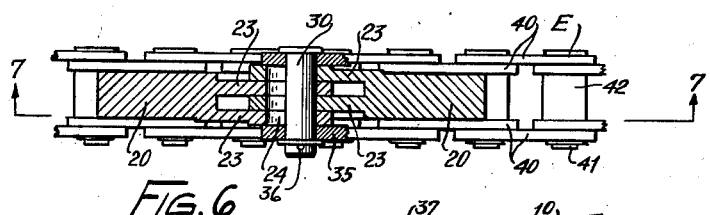
Figure 7:
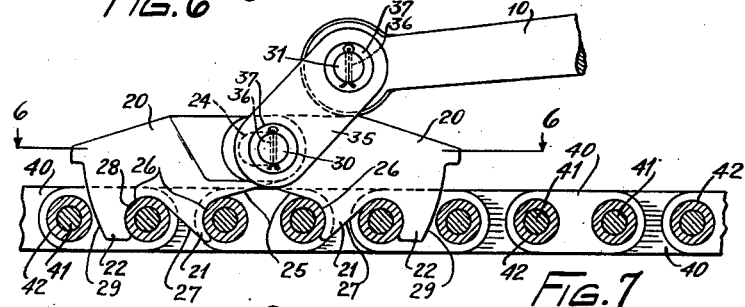
Figure 8:
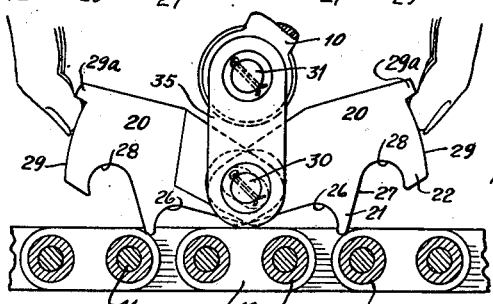

In the drawings, Fig. 1 is a plan of a freight transferring apparatus comprising a truck, a railway car and demountable containers, the truck having bridge members adapted to be attached to the railway car and being provided with propelling chains on the body of the truck and extending onto the bridge members. The containers in this view are shown as resting on the flat car, and one of them is coupled by my push and pull members to the chains of the truck. Fig. 2 is an elevation of the parts shown in Fig. 1, but with a single container mounted on the truck. Fig. 3 is a sectional elevation of a bridge member with the adjacent portions of the truck and flat car and a container connected by my mechanism with the propelling chain on the bridge member, the plane of the section being indicated by the line 3—3 on Fig. 1. Figs. 4 and 5 are respectively a plan and an elevation of the connecting member. Fig. 6 is an enlarged section of the attachment device, the plane of the section being indicated by the line 6—6 on Fig. 5. Figs. 7 and 8 are side elevations of the attachment device (sectioned on the line 7—7 on Fig. 6), showing it respectively as connected to the chain and as being removed therefrom or placed thereon. Fig. 9 is a detail in horizontal section of the container socket which receives the head of the connecting member.

Referring first to Figs. 1 and 2, A indicates a highway truck, which may be in the form of a trailer pivotally connected to a tractor; B indicates a railway car; C, freight containers adapted to be mounted on the truck or car, these containers preferably having skid rails c on their bottoms adapted to occupy guiding channels a of the truck or b of the car. At the rear of the channels a on the truck are bridge members D which have upwardly facing channels adapted to align with those of the truck and car, the outer ends of the bridge members being connected by suitable attaching devices b1 to the car.

Mounted on the tractor are a pair of propelling chains E which extend parallel with the guide channels a for the full length thereof and continue along the bridge members D. The connection from the containers to the chain is made by a pair of push and pull members F removably connected at one end to the container and at the other end to the chain by the attachment device of this invention.

The push-and-pull bar proper, as shown in Figs. 4 and 5, comprises a rod 10 having at one end a flattened spherical head 11 and at the other end an eye 12. The flattened spherical head 11 is adapted to pass through a vertically elongated rectangular opening c', Fig. 9, in the side wall of the container base, into a spherical socket c2 in such base, and then by being rotated a quarter turn, caused to bridge the opening to such socket and thus become attached to the container, as set out more fully in my copending application No. 32,130, filed July 18th, 1935.

The other end of the push and pull bar 10 is equipped with my peculiar attachment device. This comprises a pair of jaws 20 having downwardly extending teeth 21—22, the jaws being forked at their outer ends to provide overlapping ears 23 which are slotted at 24 to allow the passage of the pin 30, whereby the two jaws are loosely hinged to each other.

A pin 31 extends through the eye 12 of the push and pull bar. The material of this eye has flat sides which are substantially the same width as the distance across the two pivoted jaws 20. A pair of links 35 lie on opposite sides of the hinged jaws and the bar and have holes through which the two pins 30 and 31 pass, whereby the links are pivoted to the bar and the pair of jaws. Each of the pins 30 and 31 may conveniently have a head on one end and at the other end receive a cotter pin 36 beyond a washer 37 on the pin 30 or 31. This provides a simple construction enabling ready assemblage or dismounting of the parts of the attachment device.

The chain E is of the usual formation of a sprocket chain, being composed of two sets of overlapping links 40, pins 41 extending through such links, and rollers 42 embracing the pins between the innermost links. The teeth 21 and 22 of my jaws are specially formed, as about to be described, so that they may readily pass into space between adjacent rollers 42 and at the same time obtain a firm grip thereon.

The bottom edge of each jaw when the jaws are horizontal, as shown in Fig. 7, inclines downwardly adjacent the pivot as at 25 and then curves for about half a circumference as at 26, forming the engaging face of the tooth 21. The underside of this tooth extends in an inclined course as shown at 27, to clear the adjacent roller when the jaw is tipped up, as shown in Fig. 8. The jaw edge then makes a curve of substantially a semi-circle 28 to the bottom of the tooth 22, the far edge of this tooth being curved substantially concentrically about the pivot pin 30, as shown at 29. At the upper edge of these curved portions 29 I prefer to make outward ledges 29a providing ready means for engagement of the operator's hand to lift the jaws, as illustrated in Fig. 8.

By reason of the peculiar formation of the teeth on the jaws, and also due to the loose pivoting of the jaws by the slots 24, the jaws may be very readily pushed down into effective engagement with the chain rollers or released therefrom, while when in engagement they will maintain a firm connection therewith. Pivoting of the two jaws together enables each to maintain its engagement with the chain when the latter bends at an angle in passing from the truck to the bridge or vice versa.

As shown in Fig. 3, the bridge member D is pivoted to the truck at 50. Concentric with the pivot is a roller 51 over which the chain E passes from the truck to the bridge. The bridge carries a driving sprocket 52 around which the chain loops to pass backwardly by a reach 53 thereof to the forward end of the truck. Suitable gearing, illustrated in my copending application No. 39,725, filed September 9th, 1935, connects the sprocket 52 with a propelling motor 55, or other means may be employed to propel the chain so that it travels in either direction as desired.

When the upper reach of the chain E is traveling away from the car B, the anchorage device, when the container starts to move from the car, is in the position shown in Figs. 3 and 7, the links 35 inclining downwardly in the direction away from the container, to the jaws. When the movement of the chain is in the other direction, to shove the container from the truck onto the flat car, the links 35 will incline correspondingly in the other direction.

Whether the push-and-pull bars are pushing or pulling, there is an upward stress on the pivot pin 30 of the jaws, tending to swing the jaws toward each other so that the concave faces of the teeth firmly grasp the rollers of the chain, thus effectively anchoring the push-and-pull bar to the chain for any active movement. Notwithstanding the firm grasp of the jaws on the chain when the shifting of the container is active, the arrangement of the links together with the slotted pivotal connection of the jam at the pin 30, enables the ready release of the attachment device whenever there is no stress on the push-and-pull bar.

It will be understood from the above description that with the parts in the position shown in Fig. 3, for instance, when the chain is pulling the container from the car, the attachment device is firmly secured to the chain, but when the transfer of the container has been completed so that the push-and-pull bars are at the front end of the truck, as illustrated in Fig. 2, a slight rearward movement of the chain will carry backward the pin 30 so that the links 35 will stand substantially vertically and tension on the jaws will be relieved so that they may be readily lifted from the chain, as illustrated in Fig. 8.

It will be seen that by the simple attachment device described, I am enabled to apply the push-and-pull bars very quickly to any region of the chain. When so applied the attachment is effective for either pushing or pulling, as desired, and is independent of the flexing of the chain as it passes to or from the bridge, while when the movement has been completed, the releasing of the tension enables the attachment device to be readily detached from the chain. When the jaws are free from the chain, the push-and-pull member may be detached from the container by simply giving it a quarter turn and drawing its head out through the rectangular entrance opening to the container socket.

It will further be seen that the jaws can only interlock with the chain when the push-and-pull bar is in position with its head crosswise of the opening into the container socket, and hence if the head has been inserted at all into the socket, it will necessarily be effectively bridging the opening when the other end of the bar is attached to the chain.

I claim:

1. The combination, with a propelling chain and a container to be propelled, of a bar adapted to be removably attached at one end to the container, and a pair of jaws each pivotally connected to the bar adjacent the other end, said jaws having projecting teeth adapted to extend into spaces between the cross members of the chain and engage such cross members.

2. The combination of a bar adapted to be attached at one end to a container, a pair of jaws pivoted to each other and each having a plurality of projecting teeth to engage with the cross members of a chain, and means connecting the pivot of the jaws to the other end of the bar.

3. A device for attaching a container to a propelling chain comprising a pair of jaws with teeth to engage the chain, the jaws being pivoted together, a member adapted to be attached to the container, and a pair of links pivoted at one end to said member and at the other end to the pivot of the jaws.

4. A device for attaching a container to a propelling chain comprising a bar and means at one end for its removable attachment to a container, said bar having an eye at the other end, a pair of links on opposite sides of the eye pivotally mounted by a pin occupying the eye, and a pair of jaws pivoted together on a pin which also extends into the links, said jaws having teeth to engage the chain.

5. A device for attaching a container to a propelling chain comprising a push-and-pull bar for attachment to the container and a pair of pivoted jaws connected with the push-and-pull bar, said jaws having teeth with curved faces to engage cross members of the chain, the concavities on the teeth of one jaw facing the concavities of the teeth of the other jaw.

6. An attaching device of the character described comprising a bar, a pair of mutually pivoted jaws pivotally attached to the bar, each jaw having on its underface a plurality of teeth, the teeth on the engaging side being concaved to engage a cross member of the chain, and on the other side being inclined to clear the adjacent cross member when the jaw is tipped away from the chain.

7. An attaching device comprising a bar, a pair of jaws pivoted together, a pair of links pivotally connecting the pivot of the jaws with the bar, each jaw having projecting teeth one face of which is concaved to engage the cross member of the chain and the other face of which is cut away on an incline to clear the adjacent cross member.

8. An attaching device of the character described comprising a bar, and a shoe pivotally connected therewith and consisting of a pair of toothed jaws provided with slots loosely embracing a pivot pin providing a loose mutual pivot for the two jaws.

9. The combination of a pair of jaws each having teeth adapted to engage a sprocket chain, said jaws having overlapping ears with slots through them, a pivot pin passing through said ears, a bar adapted to be attached to a container, and links connecting a pin on the bar with said pivot pin of the jaws.

10. The combination with a propelling chain of the sprocket type having two sets of overlapping links connected by cross pins, each pin being surrounded by a roller, a pair of jaws each provided with a plurality of teeth having concave faces to engage adjacent rollers on the same side of the roller, the teeth being cut away on the side opposite the engaging face to allow it to clear the adjacent roller, a bar adapted to be attached at one end to a container to be moved, means for mutually pivoting the two jaws described, and links pivotally connecting the pivot of the jaws with the other end of the bar.

11. The combination of a propelling chain and means for moving it, a support for the chain including two portions adapted to stand at an angle to each other so that the chain may pass from one of such portions to the other, a push-and-pull bar adapted to be attached to a container, and means for anchoring the same to the chain comprising a pair of jaws pivoted together and adapted to extend into the openings of the chain irrespective of the bending of the chain, and a connection between such jaws and the push-and-pull bar.

12. The combination of a vehicle equipped with a bridge member adapted to connect the vehicle with a platform, a freight container adapted to be supported on the vehicle or platform, a propelling chain on the vehicle and bridge member, a push-and-pull bar adapted to be connected at one end to the container, and means for removably anchoring the other end of the push-and-pull bar to the chain at various regions thereof, said means comprising a pair of jaws each having teeth to extend into spaces of the chain and engage cross portions thereof, and means pivotally connecting the jaws with the push-and-pull bar.

13. The combination of a container having a socket with an entrance opening restricted in one direction, a push-and-pull bar having a head transversely extended in one direction and adapted to be inserted through the opening into the socket and thereafter by turning the bar caused to bridge the opening, a propelling mechanism, and means for attaching the push-and-pull bar to the propelling mechanism effective after the bar has been turned from its inserting position in the socket.

14. The combination of a container having a spherical socket with a rectangular entrance opening, a push-and-pull bar having a flattened spherical head adapted to be inserted into the socket through the opening, a propelling chain and means for attaching the other end of the push-and-pull bar to the chain only when it has been given a quarter turn from its inserting position.

15. The combination of a highway truck having a pair of parallel guideways for supporting a container and equipped with a pair of bridge members aligned with the guideways and adapted to be connected with a vehicle or platform, a pair of propelling sprocket chains on the truck and bridge members, means for operating the chains, a container adapted to register with the guideways, a pair of push-and-pull bars adapted to be connected at one end to the container, and means for removably anchoring the other ends of the push-and-pull bars to the corresponding chains, each of said means comprising a pair of jaws pivoted together and having teeth to extend into spaces of the chain and engage cross portions thereof, and link mechanism to connect the pivot of each pair of jaws with the corresponding push-and-pull bar.

16. The combination of a vehicle having guideways for a container, a pair of propelling chains on the vehicle, a pair of push-and-pull bars adapted to be attached to a container, a pair of attaching devices pivotally connected to the bars respectively, each attaching device comprising a pair of oppositely extending shoes, each shoe having a plurality of downwardly extending teeth adapted to extend into spaces of the corresponding chain and engage cross members of the chain.

17. A device for attaching a container to a propelling chain comprising a bar attachable at one end to the container, a shoe having teeth to engage the chain, and a connecting link pivoted at one end to the shoe and extending away from the chain and pivoted at the other end to the bar, the link being short enough so that said end of the bar may bear against the shoe.

18. The combination of a vehicle, a propelling mechanism thereon, a container, a connecting device having means adapted to be detachably connected to the container and to the propelling mechanism, respectively, the two means being interrelated in such manner that one means can be connected, in a manner to complete the coupling between the container and mechanism, only when the other means is in a particular connected position.

19. The combination of a vehicle, a propelling chain thereon, a container, a push-and-pull bar having means at one end adapted to be detachably connected to the container and means for detachably connecting the other end of the bar to the propelling chain, the two means being interrelated in a manner to complete the coupling between the container and chain, only when the other means is in a particular connected position.

20. The combination of a vehicle, a propelling chain thereon, a container, a push-and-pull bar having a head rigid with one end adapted to be detachably connected to a socket in the container in a predetermined turned position of the head and means for detachably connecting the other end of the bar to the propelling chain in a predetermined turned position of the bar, said means being ineffective to couple the bar to the chain except when the head is in said turned position.

21. The combination of a highway truck having a pair of upwardly facing channels, a demountable container having skid rails on its bottom adapted to occupy such channels, a pair of propelling chains on the truck moving parallel with the channels, a pair of push and pull bars connecting the respective chains with the container, the connection to the container being by means of a pair of sockets on the container and heads on the push and pull bars, said heads being formed to enter the sockets in non-active position of the push and pull bars and to be retained therein when the bars are given substantially a quarter turn, there being means for attaching the push and pull bars to the chains in such turned position.

BENJAMIN F. FITCH.